United States Patent [19]

O'Rourke

[11] Patent Number: 5,390,542
[45] Date of Patent: Feb. 21, 1995

[54] MEMBRANE FOR A FLUID FLOW METER

[75] Inventor: Eugene L. O'Rourke, Corona Del Mar, Calif.

[73] Assignee: Measurement Technology International, Santa Fe Springs, Calif.

[21] Appl. No.: 173,387

[22] Filed: Dec. 21, 1993

[51] Int. Cl.⁶ .......................... G01F 3/00; G01F 1/54
[52] U.S. Cl. ........................... 73/269; 73/861.21
[58] Field of Search ............... 73/269, 861.18, 861.21

[56] References Cited

U.S. PATENT DOCUMENTS 3,867,839  2/1975  Herzl .
4,409,830 10/1983  de Jong et al. ................ 73/269
4,577,510  3/1986  Bur et al. .
4,910,794  5/1990  Ingman .
5,069,067 12/1991  Ingman .

FOREIGN PATENT DOCUMENTS 59-5917  1/1984  Japan .
59-40118 3/1984  Japan .
63-3245  1/1988  Japan .
0901823  1/1982  U.S.S.R. ...................... 73/269

Primary Examiner—Herbert Goldstein
Attorney, Agent, or Firm—Robbins, Berliner & Carson

[57] ABSTRACT

A fluid flow meter has a housing with a fluid inlet and a fluid outlet and defining therebetween a fluid flow path. The flow meter has a flexible membrane having a inlet end mounted at an inlet region of the fluid flow path and a outlet end mounted at an outlet region of the fluid flow path. The flexible membrane produces undulating motion in response to fluid flow in the fluid flow path. Fluid flow rate is measured by sensing the undulating motion of the membrane. Performance of the meter is enhanced by laminating a layer of material to the membrane.

10 Claims, 4 Drawing Sheets 5,390,542

MEMBRANE FOR A FLUID FLOW METER

FIELD OF THE INVENTION

The present invention relates in general to volumetric fluid flow measurement and in particular to an improved membrane for use in a volumetric fluid flow meter. More particularly, the present invention is related to a membrane with lamination for improving performance of the meter, for example, by improving the durability of the membrane and its response to low fluid flow rate.

BACKGROUND OF THE INVENTION

Fluid flow meters, such as those disclosed by Dov Ingman in U.S. Pat. Nos. 4,920,794 and 5,069,067 both of which are incorporated herein by reference, measure flow rate of a fluid by measuring undulation of a flexible membrane in response to passage of the fluid through a flow chamber. The flexible membrane spans between two points along the flow path of the fluid and has a length which is long enough to undulate and divide, with a pair of opposing walls, the flowing fluid into discrete quanta, each with a determinable volume. By detecting the motion of the membrane, the movement of the fluid quanta and therefore the flow rate of the fluid can be measured.

Among the factors affecting the performance of the above described flexible membrane fluid flow meters are the physical properties of the membrane.

For example, an ideal membrane would be one that is formed from material with very low mass and a high modulus of elasticity. Theoretically, with a zero mass membrane, the resonant frequency of the membrane would be infinite and would therefore not resonate or flutter because the actual frequency of motion induced in the membrane by the fluid flow can never reach infinity. In addition, an ideal membrane should require only negligible energy to move in response to the fluid flow so that it can measure very low or near zero flow rates.

The mass of a membrane is proportional to its thickness. However, the stiffness of a membrane is proportional to the cube of its thickness. Therefore, decreasing the thickness of the membrane to reduce its mass would decrease the stiffness at a greater rate. If the membrane is too thin and the stiffness is reduced too far, a portion of the membrane will lie limply on a membrane face under gravitational force. As a result, a limit to the possible reduction in membrane thickness is the point where the stiffness is reduced to below the level required to maintain membrane shape against the force of gravity.

Moreover, although it is desirable to have the thinnest membrane capable of maintaining its shape against gravity, membrane thickness is generally desirable in order to minimize leakage through the gaps between the edges of the membrane and the side walls of the flow chamber. If the membrane can be made thicker, the required manufacturing tolerances to maintain the effective seal between the membrane edges and the side walls can be relaxed, thereby reducing manufacturing costs.

Thus, the ideal membrane would be relatively thick to minimize sealing problems, of low density to minimize mass and stiff enough to enable it to support its own weight. In other words, the membrane thickness is a trade off between the membrane mass, the required stiffness for supporting its own weight and the required tolerances for maintaining an effective seal against leakage.

Another factor affecting the performance of a flexible membrane fluid flow meter is its durability. One factor affecting the durability of a membrane is the short operating life which could result from membrane fatigue due to repetitive flexing thereof at the clamping points.

SUMMARY OF THE INVENTION

The present invention provides a fluid flow meter which has a housing with a fluid inlet and a fluid outlet and defining therebetween a fluid flow path. The fluid flow meter has a flexible membrane with an inlet end mounted at an inlet region of the fluid flow path and an outlet end mounted at an outlet region of the fluid flow path. The membrane is designed to produce undulating motion along an active portion in response to fluid flow in the fluid flow path. The fluid flow meter also has a device responsive to the undulating motion of the membrane for measuring the fluid flow. In accordance with the present invention, the membrane has at least one laminated portion for improving performance of the meter.

In another aspect, the present invention also provides a method for improving performance of a fluid flow meter. The fluid flow meter has a membrane mounted between an inlet and outlet for dividing fluid flow through the meter into discrete quanta. Fluid flow is measured by measuring undulating motion along an active portion of the membrane. The method includes the steps of supporting the membrane with at least one layer of flexible material laminated to the active portion of the membrane, sensing the undulating motion of the membrane, and measuring volume of fluid flowing through the meter based upon the undulating motion of the membrane.

In still another aspect, the present invention provides a method for measuring flow rate of a fluid, including the step of defining a fluid flow path by a first pair of opposing walls which are separated by a predetermined first distance and a second pair of opposing walls which are separated by a predetermined second distance. The method also includes the step of providing a membrane, with a predetermined thickness, which undulates and contacts the first pair of opposing walls in response to fluid flow in the flow path. The method also includes the step of laminating an additional layer of flexible material to a portion of the membrane based upon one or more dimensions of the membrane.

DESCRIPTION OF THE PREFERRED EMBODIMENT

Figure 1:
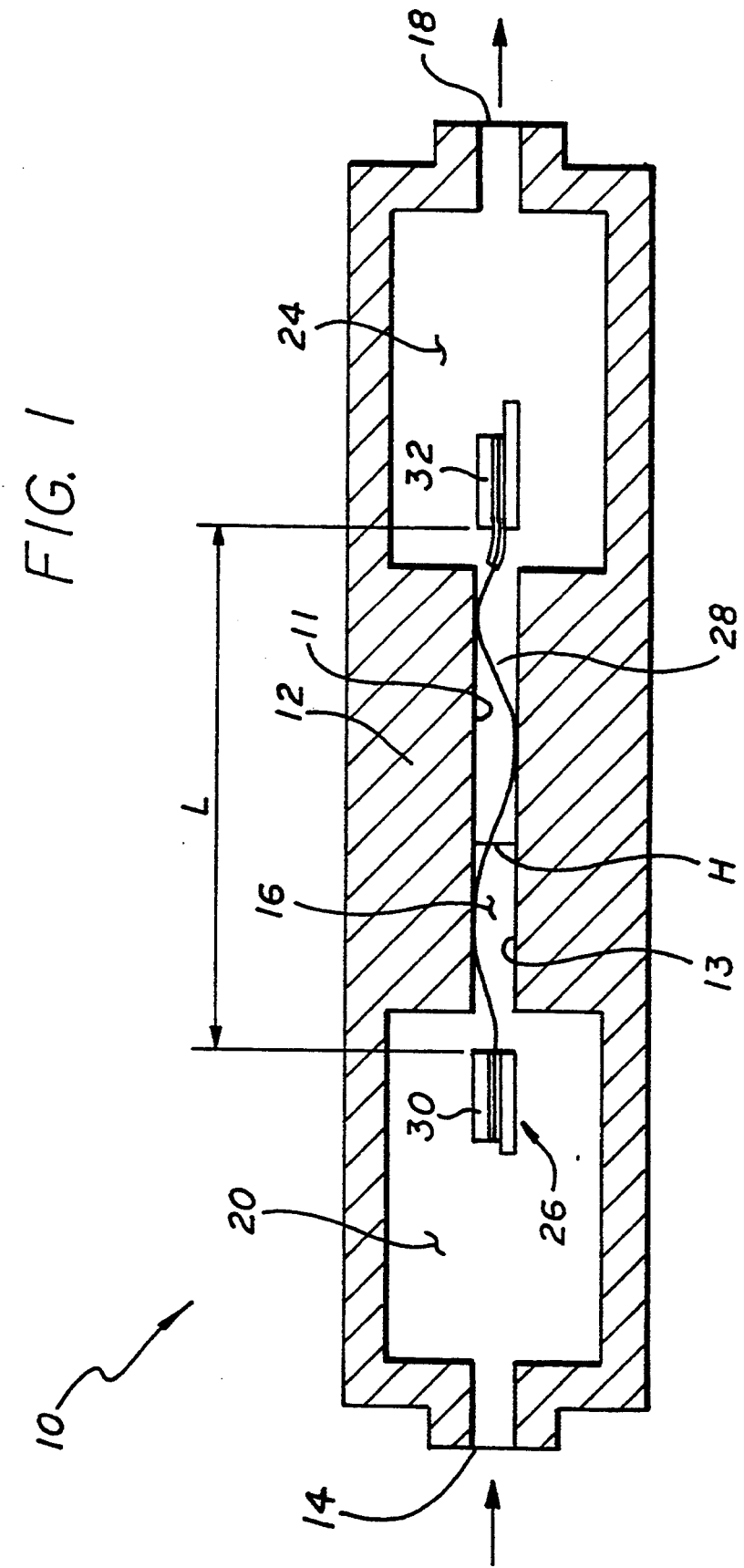
FIG. 1 depicts a fluid flow meter in which a flexible membrane with one or more laminated portions is used to measure fluid flow.

FIG. 1 shows a fluid flow meter 10 with a housing 12 having an inlet aperture 14, a central flow chamber 16 and an outlet aperture 18. The central flow chamber 16 has a first pair of opposing walls 11 and 13 defining a predetermined height (H) and a second pair of opposing walls (see FIG. 3, reference numerals 15 and 17) defining a predetermined width (W). The first pair of walls 11, 13 and the second pair of walls 15, 17 together define a fluid flow path in the meter 10. Optionally, an inlet chamber 20 is provided between the inlet aperture 14 and the central flow chamber 16 for removing unwanted particles, such as debris and moisture, from the fluid before the fluid enters the central flow chamber 16. Optionally, an outlet chamber 24 is also provided between the central flow chamber 16 and the outlet aperture 18 for removing unwanted particles in the event fluid flows through the meter 10 in a reversed direction.

A sensor assembly 26 is mounted within the fluid flow meter 10. The sensor assembly 26 includes a sensor membrane 28 with a thickness (T) which is mounted between an inlet membrane mounting assembly 30 and an outlet membrane mounting assembly 32. The length (L) of the sensor membrane 28 between the inlet membrane mounting assembly 30 and the outlet membrane mounting assembly 32 defines an action portion that undulates in response to fluid flow through the central flow chamber 16. The sensor membrane 28 is made of flexible material such as polyester and has sufficient length to maintain two or more points of contact simultaneously with the walls 11 and 13 when it undulates in response to the fluid flow.

The height (H) between the first pair of opposing walls 11, 13, the length (L) of the active portion and the thickness (T) of the sensor membrane 28 are selected to optimize the responsiveness of the sensor membrane to the fluid flow. That is, they are selected so that the sensor membrane 28 is very flexible and yet would support its own weight.

Preferably, the sensor membrane 28 is made of or coated with an antistatic substance (not shown) to prevent build-up of static electricity and/or with a hydrophobic substance (not shown) to prevent build up of moisture.

The inlet and outlet membrane mounting assemblies 30 and 32 are preferably made of material, such as stainless steel or glass-filled polyester, which has similar thermal characteristics as the sensor membrane 28.

A guide block and/or a guide extension (not shown), such as described in the above patents to Dov Ingman, may be provided at the inlet and outlet membrane mounting assemblies 30 and 32 to improve the flexure of the sensor membrane 28.

The inlet and outlet membrane mounting assemblies 30 an 32 can also include clamping means described by Dov Ingman in a U.S. patent application filed Nov. 23, 1992 with Ser. No. 07/979,996, and which is incorporated herein by reference.

It is preferable that the thermal expansion of the housing 12 of the meter 10 matches the thermal expansion of the sensor membrane 28.

In operation, fluid enters the meter 10 through inlet aperture 14 and passes through inlet chamber 20 where debris are deposited or filtered. The fluid then passes through the central flow chamber 16 and the outlet chamber 24, and exits through the outlet aperture 18. When the fluid flows through the central flow chamber 16, it causes the sensor membrane 28 to undulate and contact the walls 11 and 13 of the central flow chamber 16. The undulating motion of the sensor membrane 28 can be detected by one of the many methods described in the prior art, such as by passing a light beam across the central flow chamber 16 through a path which can be broken or cut off by the undulating motion of the sensor membrane 28, or by providing a thin layer of piezoelectric material (not shown) on the sensor membrane 28 and detecting changes in the electrical potential generated by the piezoelectric material due to the undulating motion of the sensor membrane 28.

Figure 2:
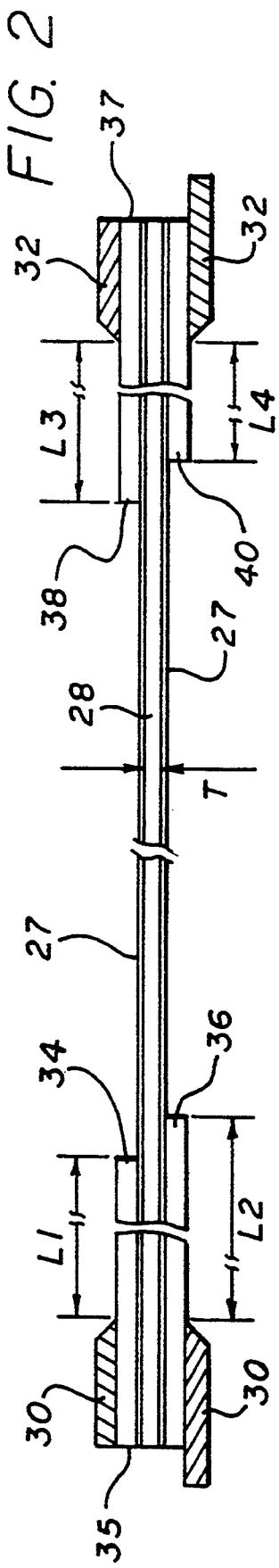
FIG. 2 is a side view of a membrane depicting preferable portions thereof which can be laminated to enhance performance of the fluid flow meter.
Figure 3:
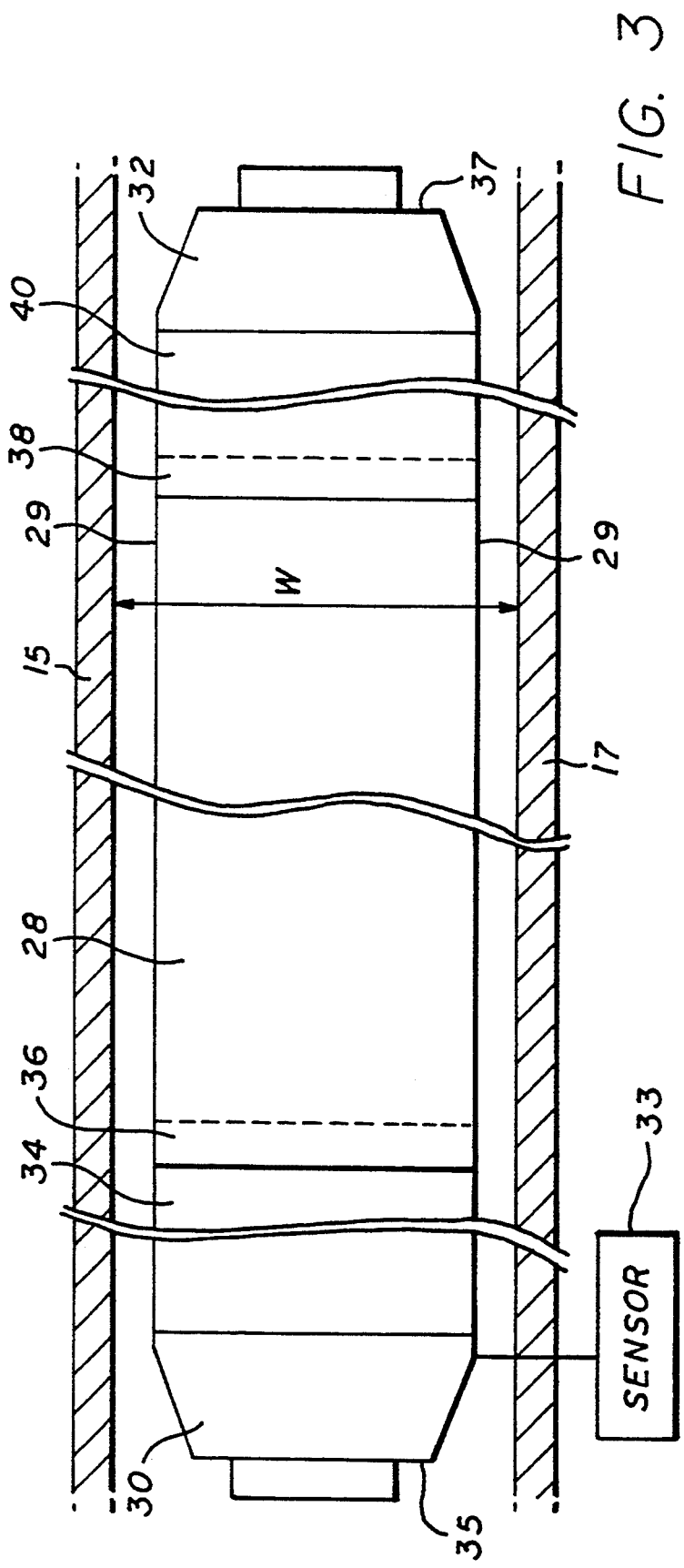
FIG. 3 is a top plan view of the membrane shown in FIG. 2 and depicts preferable portions thereof which can be laminated to enhance performance of the fluid flow meter.

Referring to FIGS. 2 and 3, in accordance with the present invention, performance (i.e., response to fluid flow characteristics such as density, temperature and flow rate of the fluid) of the sensor membrane 28 is enhanced by increasing the stiffness of at least one portion of the sensor membrane 28, so that the overall mass of the sensor membrane 28 is not substantially affected. The stiffness is increased based upon design parameters of the meter 10, such as the thickness and the length of the active portion, or the modulus of elasticity of the sensor membrane 28, or the amplitude of undulation of the sensor membrane 28 as defined by the height (H) of the flow path. In the presently preferred embodiment, the stiffness is increased preferably by increasing the thickness of at least one portion of the sensor membrane 28, which in turn is increased preferably by laminating the sensor membrane 28 with one or more additional layers of flexible material at one or more of the positions, such as positions 34, 36, 38 and 40 shown in FIG. 2.

Laminating the sensor membrane 28 with one or more additional layers of flexible material helps to support the sensor membrane 28 against collapsing, and allows a reduction in thickness in the active portion (i.e., the portion which undulates) of the sensor membrane 28 while maintaining (or even increasing) the appropriate stiffness of the sensor membrane 28.

Laminating the sensor membrane 28 at the inlet and/or outlet mounting assemblies 30, 32 also improves the performance of the meter 10 by reinforcing the sensor membrane 28 against fatigue failure at the mounting points of the sensor membrane 28 and thereby increasing the durability of the sensor membrane 28.

Lamination at the outlet end of the membrane increases the bending moment of the sensor membrane 28 about the outlet mounting point and can thereby reduces reflection of waves by the outlet membrane mounting assembly 32. Reflection of the waves is undesirable because it distorts the undulation caused by the fluid flow. However, it needs to be noted that the bending moment of the sensor membrane 28 should preferably not be increased to a point where it would force the fluid flow back towards the inlet.

Lamination of the sensor membrane 28 at each of the portions 34, 36, 38 and 40 is achieved by affixing, such as by using an adhesive (e.g., an adhesive with product number SP23 from Sun Process, Elk Grove Village, Ill.) or other bonding techniques (e.g., thermal bonding), one or more layers of flexible material to the sensor membrane 28. A lamination should preferably extend from and be clamped by the inlet and outlet membrane mounting assemblies 30 and 32.

Referring to FIG. 3, the width at the ends 35 and 37 of the sensor membrane 28 is usually narrower than the width of the active portion because it has been determined that such narrowing of the ends 35 and 37 reduces flutter both along the flow path as well as transverse thereto. An additional layer which is laminated with the sensor membrane 28 should preferably have the same shape (i.e., with a tapered end) as the sensor membrane 28.

Each additional layer is preferably made of similar material as the sensor membrane 28. If an additional layer is made with other material, it is preferable that such other material has similar characteristics (e.g., coefficient of thermal expansion) as the sensor membrane 28.

The thickness and length of an additional layer laminated at any one of the positions 34, 36, 38 and 40 may and may not be equal to the thickness and length of the additional layers at other positions. The portion(s) of the sensor membrane 28 to be laminated, and the length and thickness of the additional layer(s) laminated thereto are selected based upon such factors as the thickness (T) of the sensor membrane 28 as well and the length (L) of the active portion of the sensor membrane 28 and height (H) of the fluid flow path, which in turn are determined based upon factors such as the lowest flow rate and/or highest flow rate required to be measured by the meter 10, and the desired durability of the sensor membrane 28.

FIG. 3 also shows the second pair of walls 15 and 17, and a sensor 33 connected to the sensor membrane 28 through the inlet sensor mounting assembly 30. The sensor 33 senses undulation of the sensor membrane 28 to measure the fluid flow rate.

Referring again to FIG. 2, performance of the meter 10 is further improved by providing an antistatic surface on the additional layer(s) laminated to the sensor membrane 28. Materials having an antistatic surface or made with antistatic material are available off-shelf.

Figure 4:
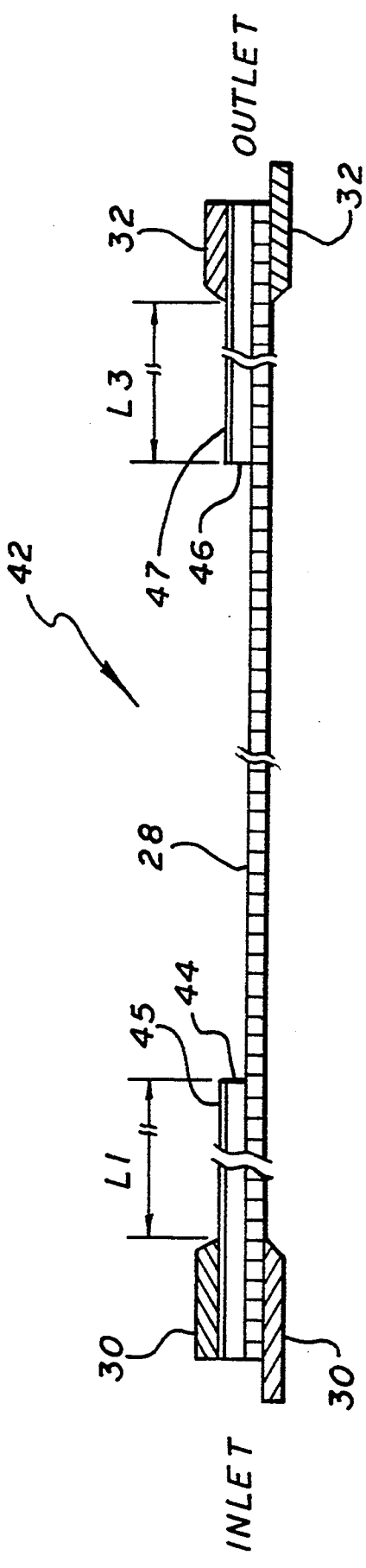
FIG. 4 is a side view of a membrane structure in which an additional layer of flexible material is laminated at each end of the membrane, with the additional layers of flexible material being laminated on the same side of the membrane.

FIG. 4 depicts a membrane structure 42 which is one implementation of the present invention. The membrane structure 42 includes a flexible sensor membrane 28 with a first layer 44 of flexible material laminated at position 34 shown in FIG. 2 and a second layer 46 of flexible material laminated at position 38.

To detect undulating motion of the sensor membrane 28, an additional layer of piezoelectric material 45, 47 can be added on one or both of the first and second layers 44 and 46. Alternatively, one or both of the first and second layers 44 and 46 can contain piezoelectric material. In that case, the additional layer 45 and/or 47 can be omitted. If other means is used for such detection, a layer of piezoelectric material is not needed.

According to one specific implementation of the membrane structure 42, the thickness (T) of the sensor membrane 28 is about 0.0015 inch. A thickness of about 0.0015 inch is the preferred membrane thickness for a fluid flow path with a length (L) of about 4 inches and a height (H) of about 0.25 inch, which are the preferred dimensions for measuring a gas flow with a maximum flow rate of 250 cubic feet per hour (CFH) and a minimum flow rate of 0.25 CFH, which is the range of gas consumption of an average household. The edges 29 (see FIG. 3) of the sensor membrane 28 are each separated from the corresponding one of walls 15 and 17 by a gap of between 0.0015 to 0.003 inch. A larger gap may allow the sensor membrane 28 to undulate more freely, but sensitivity in measuring low flow rate will be reduced thereby. The sensor membrane 28 is made from a polyester film with antistatic coating, such as Product Number 142A302 or Product Number 142J302 from Dupont Corporation. The first layer 44 of flexible material has a preferred thickness of about 0.002 inch and extends over the active portion of the sensor membrane by a length (L1) of about 0.5 inch. The second layer 46 of flexible material has a preferred thickness of about 0.002 inch and extends over the active portion of the sensor membrane by a length (L3) of about 0.25 inch. The width of each of the first and second layers, 44 and 46, is the same as the width of the sensor membrane 28. Both the first layer 44 and the second layer 46 are made with the same material as the sensor membrane 28 and are laminated with the sensor membrane 28 by means of adhesive or other bonding techniques including thermal.

Figure 5:
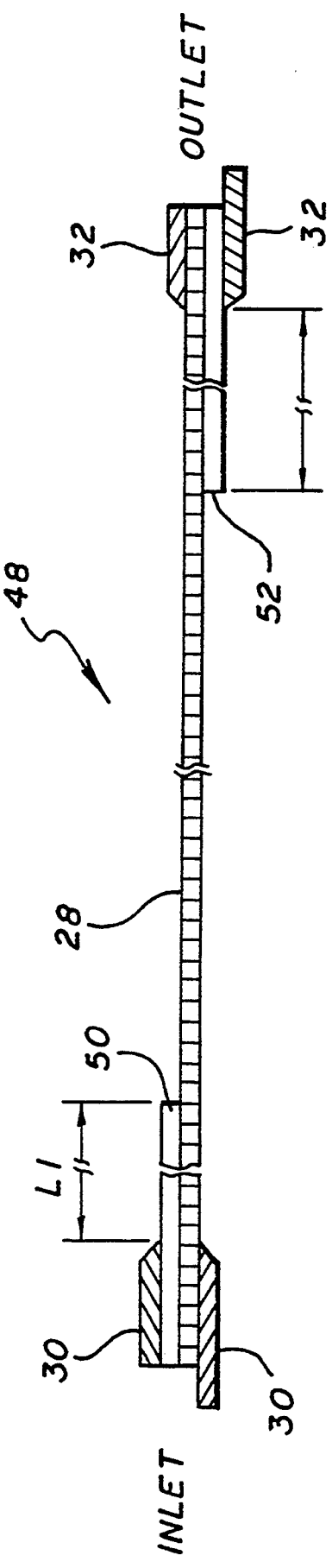
FIG. 5 is a side view of a membrane structure in which an additional layer of flexible material is laminated at each end of the membrane, with the additional layers of flexible material being laminated on opposite sides of the membrane.

FIG. 5 depicts a membrane structure 48 which is another implementation of the present invention. The membrane structure 48 includes a flexible sensor membrane 28 with a first layer 50 of flexible material laminated at position 34 shown in FIG. 2 and a second layer 52 of flexible material laminated at position 40 shown in FIG. 2. Both the first layer 50 and the second layer 52 are made with the same material as the sensor membrane 28 and are laminated to the sensor membrane 28 by means of adhesive or other bonding techniques including thermal.

To detect undulating motion of the sensor membrane 28, an additional layer of piezoelectric material (not shown) can be added on the surface of one or both of the additional layers. Alternatively, one or both of the additional layers can contain piezoelectric material and the additional piezoelectric layer can then be omitted.

According to one specific implementation of the membrane structure 48, the sensor membrane 28 has thickness (T) of approximately 0.0015 inch and an active portion (L) of about 4 inches. The height (H) of the flow path is about 0.25 inch. The first layer of flexible material 50 has a preferred thickness of about 0.002 inch and extends over the active portion of the sensor membrane 28 by a length (L1) of about 0.5 inch. The second layer of flexible material 52 has a preferred thickness of about 0.002 inch and extends over the active portion of the sensor membrane 28 by a length (L4) of about 0.25 to 0.5 inch. The width of each of the first and second layers, 50 and 52, is the same as the width of the sensor membrane 28.

Figure 6:
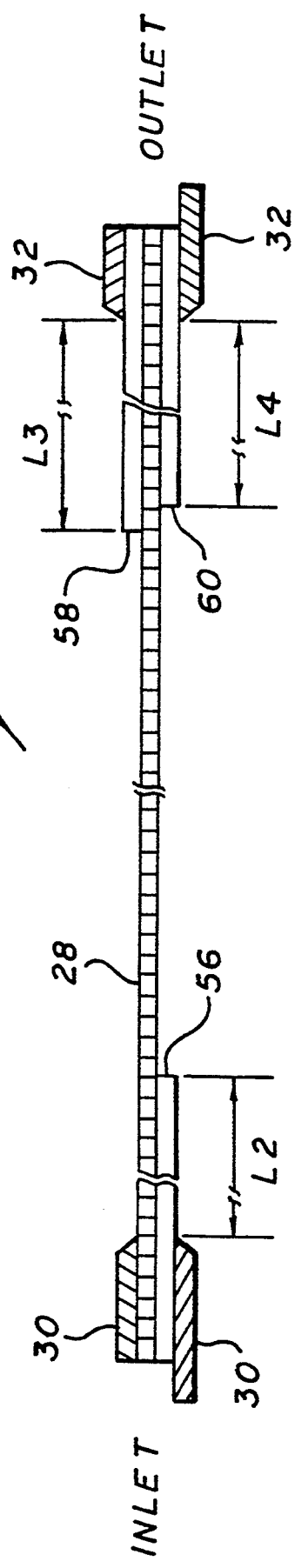
FIG. 6 is a side view of a membrane structure in which a laminated portion is provided at the inlet end of the membrane by laminating an additional layer of flexible material to the membrane, and in which a laminated portion is provided at the outlet end of the membrane by laminating two layers of flexible material, one on each side of the membrane.

FIG. 6 depicts a membrane structure 54 which is another implementation of the present invention. The membrane structure 54 includes a flexible sensor membrane 28 with a first layer 56 of flexible material laminated at position 36 shown in FIG. 2, a second layer 58 laminated at position 38 shown in FIG. 2, and a third layer 60 laminated at position 40 shown in FIG. 2. The layers 56, 58 and 60 are made with the same material as the sensor membrane 28 and are laminated to the sensor membrane 28 by means of adhesive or other bonding techniques including thermal.

To detect undulating motion of the sensor membrane 28, an additional layer of piezoelectric material (not shown) can be added on the surface of one or both of the additional layers. Alternatively, one or both of the additional layers can contain piezoelectric material and the additional piezoelectric layer can then be omitted.

According to one specific implementation of the membrane structure 54, the sensor membrane 28 has a thickness (T) of approximately 0.0015 inch and an active portion (L) of about 4 inches. The fluid flow path has a height (H) of about 0.25 inch. The first layer 56 has a preferred thickness of about 0.002 inch and extends over the active portion of the sensor membrane 28 by a length (L2) of about 0.25 inch. The second and third layers 58 and 60 each has a preferred thickness of about 0.002 inch. The second layer 58 extends over the active portion of the sensor membrane 28 by a length (L3) of about 0.50 inch. The third layer 60 extends over the active portion of the sensor membrane 28 by a length (L4) of about 0.25 inch.

Figure 7:
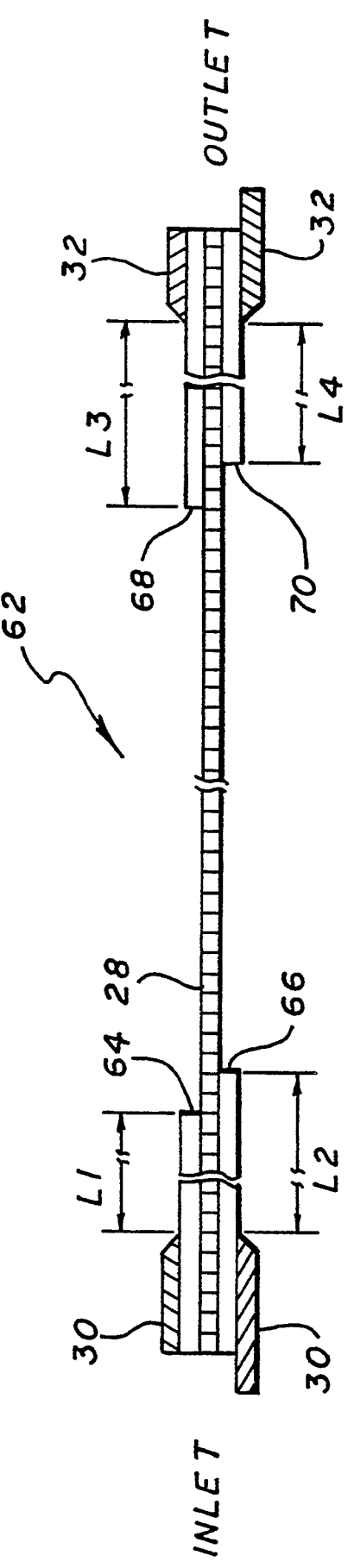
FIG. 7 is a side view of a membrane structure in which a laminated portion is provided at each end of the membrane, each by laminating two layers of flexible material, one on each side of the membrane.

FIG. 7 depicts a membrane structure 62 which is another implementation of the present invention. The membrane structure 62 includes a flexible sensor membrane 28 having first and second layers 64 and 66 of flexible material laminated at positions 34 and 36 respectively shown in FIG. 2, and third and fourth layers 68 and 70 flexible material laminated at positions 38 and 40 respective shown in FIG. 2. The additional layers 64, 66, 68, 70 are made with the same material as the sensor membrane 28 and are laminated to the sensor membrane 28 by means of adhesive or other bonding techniques including thermal.

To detect undulating motion of the sensor membrane 28, an additional layer of piezoelectric material (not shown) can be added on the surface of one or both of the additional layers. Alternatively, one or both of the additional layers can contain piezoelectric material and an additional piezoelectric layer can then be omitted.

According to one specific implementation of the membrane structure 62, the sensor membrane 28 has thickness (T) of approximately 0.0015 inch and an active portion (L) of about 4 inches. The fluid flow path has a height (H) of about 0.25 inch. The first layer 64 has a thickness of about 0.002 inch and extends over the active portion of the sensor membrane 28 by a length (L1) of about 0.5 inch. The second layer 66 has a preferred thickness of about 0.002 inch and extends over the active portion of the sensor membrane 28 by a length (L2) of about 0.25 inch. The third layer 68 has a preferred thickness of about 0.002 inch and extends over the active portion of the sensor membrane 28 by a length (L3) of about 0.125 inch. The fourth layer 70 has a thickness of about 0.002 inch and extends over the active portion of the sensor membrane 28 by a length (L4) of about 0.25 inch.

It will be appreciated by persons skilled in the art that the present invention is not limited to what has been shown and described hereinabove. For example, a laminated portion of the membrane can have more than one additional layer. In addition, the different additional layers at the same laminated portion of the membrane can further have different thicknesses and different lengths. In addition, the additional layers at the same laminated portion of the membrane can even be made of different material. Therefore, it will be understood that various modifications can be made to the invention without departing from the scope thereof, which is defined by the following claims.

What is claimed is:

1. A fluid flow meter, comprising:
   a housing having a fluid inlet and a fluid outlet and defining therebetween a fluid flow path;
   a flexible membrane having an inlet end mounted at an inlet region of the fluid flow path and an outlet end mounted at an outlet region of the fluid flow path, the membrane being designed to produce an undulating motion along an active portion in response to fluid flow in said fluid flow path; and
   a device responsive to the undulating motion of the membrane for measuring the fluid flow;
   the membrane having:
   at least a first layer of flexible material laminated to the membrane at the inlet end of the membrane;
   at least a second layer of the flexible material laminated to the membrane at the outlet end of the membrane; and
   wherein the first layer of flexible material is longer than the second layer of flexible material.

2. A fluid flow meter as in claim 1, further comprises a third layer of flexible material laminated to the membrane at the inlet end of the membrane on a reverse side of the membrane.

3. A fluid flow meter as in claim 2, further comprises a fourth layer of flexible material laminated to the membrane at the outlet end of the membrane on a reverse side of the membrane.

4. A fluid flow meter of claim 1, wherein at least one of said first and second layers has an antistatic surface.

5. A fluid flow meter of claim 1, wherein said membrane has an antistatic surface.

6. A fluid flow meter of claim 1, wherein at least one of said first and second layers contains piezoelectric material.

7. A fluid flow meter of claim 1, wherein said first and second layers have similar thermal characteristics as the membrane.

8. A fluid flow meter of claim 1, wherein the housing and the membrane have similar coefficients of thermal expansion.

9. A fluid flow meter of claim 1, wherein the membrane has a thickness of about 0.0015 inch, wherein the first layer of flexible material has a thickness of about 0.002 inch and extends over the active portion of the membrane by about 0.5 inch and the second layer of flexible material has a thickness of about 0.002 inch and extends over the active portion of the membrane by about 0.25 inch, said first and second layers being on the same side of the membrane.

10. A fluid flow meter of claim 1, wherein said membrane has a thickness of about 0.0015 inch, wherein the first layer of flexible material has a thickness of about 0.002 inch and extends over the active portion of the membrane by about 0.5 inch and the second layer of flexible material has a thickness of about 0.002 inch and extends over the active portion of the membrane by about 0.25 to 0.5 inch, said first and second layers being on opposite sides of the membrane.

* * * * *